United States Patent [19]

Maru

[11] 4,444,851
[45] Apr. 24, 1984

[54] FUEL CELL STACK

[75] Inventor: Hansraj C. Maru, Brookfield Center, Conn.

[73] Assignee: Energy Research Corporation, Danbury, Conn.

[21] Appl. No.: 392,779

[22] Filed: Jun. 28, 1982

[51] Int. Cl.³ .......................................... H01M 8/04
[52] U.S. Cl. ...................................... 429/26; 429/34; 429/35; 429/142
[58] Field of Search ................... 429/26, 35, 38, 39, 429/34, 142

[56] References Cited

U.S. PATENT DOCUMENTS

| | | | |
|---|---|---|---|
| 3,269,866 | 8/1966 | Dixon et al. | 429/26 |
| 4,182,795 | 1/1980 | Baker et al. | 429/26 X |
| 4,192,906 | 3/1980 | Maru | 429/13 |
| 4,233,369 | 11/1980 | Breault | 429/26 |
| 4,276,355 | 6/1981 | Kothmann et al. | 429/26 |
| 4,310,605 | 1/1982 | Early et al. | 429/26 X |
| 4,324,844 | 4/1982 | Kothmann | 429/26 |
| 4,342,816 | 8/1982 | Kothmann et al. | 429/38 X |
| 4,345,008 | 8/1982 | Breault | 429/26 |

*Primary Examiner*—Charles F. LeFevour

[57] ABSTRACT

A fuel cell stack comprised of a number of fuel cells each including first and second passage means for conveying first and second process gases, respectively, through the stack, the stack further including a first internal manifold common to the first passages means and a number of third passages means for conveying a cooling gas through the stack.

30 Claims, 10 Drawing Figures 4,444,851

FUEL CELL STACK

BACKGROUND OF THE INVENTION

This invention relates to fuel cells and, in particular, to fuel cells arranged in a fuel cell stack.

In a conventional fuel cell, fuel process gas and oxidant process gas are passed through first and second passages disposed adjacent the anode and cathode electrodes, respectively, to effect electrochemical reaction. The first and second passages are usually arranged in transverse (crossing) fashion in order to situate the entry and exit ports of the passages on different external faces of the cell. This, in turn, permits ready access to the ports through separate external manifolds which provide the necessary isolation between the fuel and oxidant gases. With this type of arrangement, disposition of a plurality of cells in a stack is made easy, since associated cell faces with corresponding ports can be aligned to form a common stack face which can then be served by a common external manifold. A fuel cell stack of this type is disclosed, for example, in U.S. Pat. No. 4,192,906, issued Mar. 11, 1980 and assigned to the same assignee hereof.

It is also customary in fuel cells of the aforementioned type to provide for cooling of the cell. In the '906 patent, this is accomplished by providing third passages for carrying a cooling gas. The entry and exit ports of the third passages are aligned with the entry and exit ports, respectively, of either the first passages or the second passages. In this way, the process gas of the latter passages and the external manifolds serving same also serve as the cooling gas and manifolds, respectively, of the third passages.

While the described arrangement provides desired isolation between oxidant and fuel process gases and desired cooling, research is still being conducted for alternative techniques which, while still providing the necessary isolation, also result in improved fuel cell performance.

It is a primary object of the present invention to provide an improved fuel cell stack.

It is a further object of the present invention to provide a fuel cell stack and associated manifolding which provide enhanced fuel cell stack performance.

It is also an object of the present invention to provide a fuel cell stack and associated manifolding of simple construction.

SUMMARY OF THE INVENTION

In accordance with the principles of the present invention, the above and other objectives are realized in a fuel cell stack in which first and second passage means are arranged in opposition to support countercurrent flow of the fuel and oxidant process gases and in which internal manifolding means is common to and couples with one of the first and second passage means. The other of the first and second passage means couples with a first external manifolding means which is likewise common to such other passage means. A third passage means is disposed transverse to the first and second passage means and carries a cooling gas which is coupled to the third passage means through a second external manifold means.

In a further aspect of the invention, a containment vessel encloses the fuel cell stack and cooperates therewith to define the first and second external manifold means. In yet a further aspect of the invention, particular plate configurations for effecting the manifolding and countercurrent process gas flow and the cooling gas flow are also disclosed.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
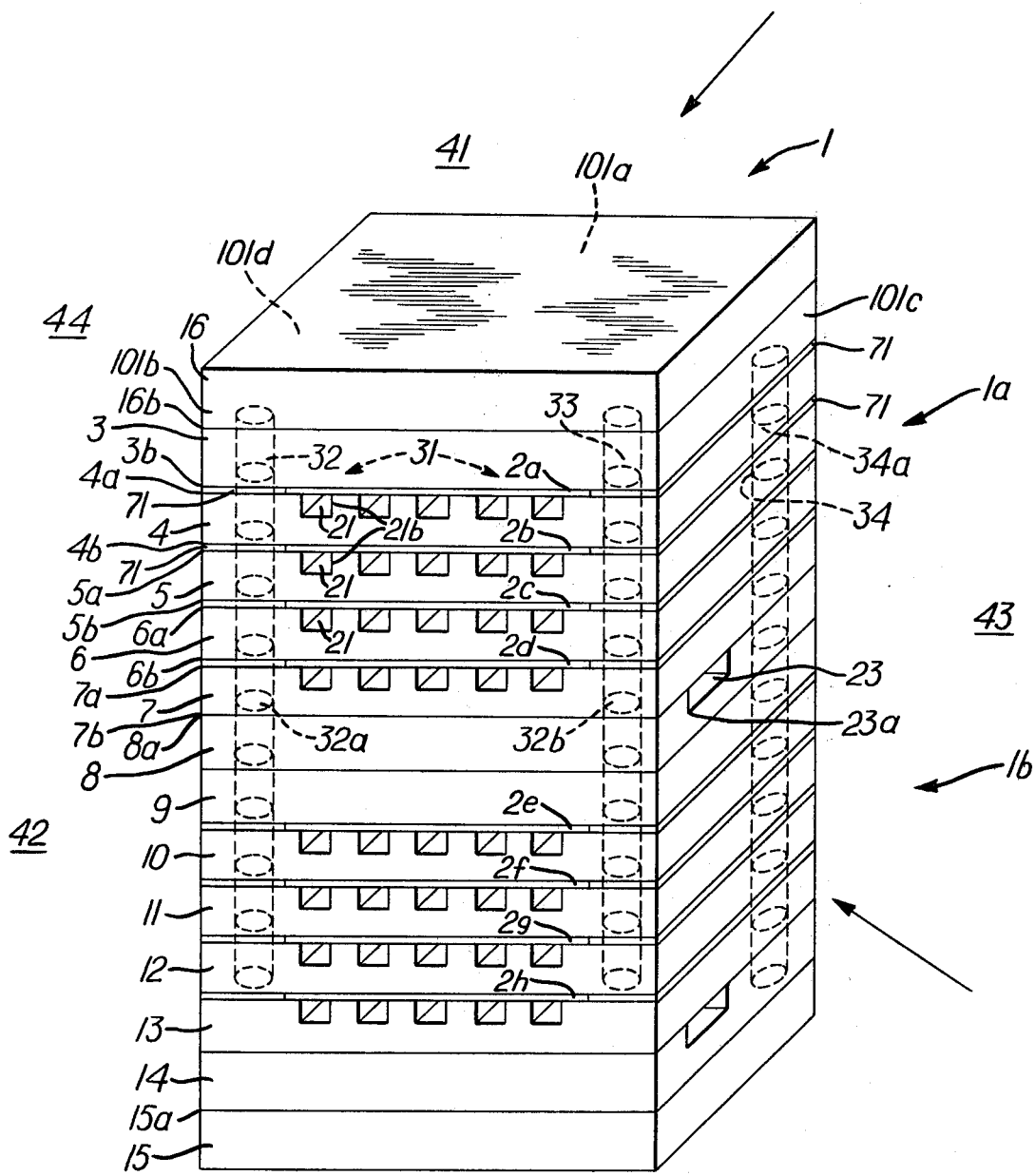
FIG. 1 shows a fuel cell stack incorporating the principles of the present invention.

In FIG. 1, a fuel cell stack 1 in accordance with the invention is shown. The stack 1 includes top and bottom sub-stacks 1a and 1b. Cell assemblies 2a–2h each jointly define an electrolyte layer and associated gas diffusion anode and cathode electrodes. Adjacently disposed plates, in turn, cooperate with each cell assembly and spacer elements 71 disposed at lateral ends of each assembly to define individual fuel cells.

More particularly, top separator plate 3 is of the unipolar type and carries via internal passages 20 in its bottom surface 3b fuel process gas to the anode of the top cell assembly 2a. A bipolar plate 4 underlies the assembly 2a and overlies the next successive cell assembly 2b. This plate includes in its top surface 4a passages 21 for carrying oxidant process gas to the cathode of cell 2a and in its bottom surface 4b passages 20 for carrying fuel process gas to the anode of cell assembly 2b. Plates 5 and 6 are of similar bipolar type and contain passages 20 in their bottom surfaces 5b and 6b for fuel process gas transport to the anodes of their respective succeeding cell assemblies and passages 21 in their top surfaces 5a and 6a for oxidant process gas transport to the cathodes of their respective preceding cell assemblies. Plate 7, in turn, is of the unipolar type, containing passages 21 in its top surface 7a for oxidant gas conveyance to the cathode of the last cell assembly 2d of sub-stack 1a. The assemblies 2a through 2d and the cooperating separator plates 3–7 therefore define a sub-stack of four fuel cells.

Separator plates 9–13 are of similar configuration as separator plates 3–7, respectively. Bottom stack 1b, therefore, also contains four fuel cells jointly defined by plates 9–13 and cell assemblies 2e–2h.

A thermal control plate 8 is disposed beneath the sub-stack 1a and has a cooling gas transport conduit or passage 23 in its top surface 8a in communication with a heat-generating surface of the sub-stack, namely, the bottom surface 7b of unipolar plate 7. A like thermal control plate 14 communicates with the bottom surface of the unipolar plate 13 for cooling sub-stack 1b.

In accordance with the invention, the fuel cell stack 1 is further provided with an internal manifolding system 31, for coupling fuel process gas and exhausted fuel process gas to and from the internally disposed input and output ports of the passages 20. Such mainfolding system enables disposition of the fuel gas passages 20 in opposite or countercurrent relationship to the oxidant gas passages 21, while still allowing the input and output ends 21a (not visible) and 21b of the latter passages to open externally of the stack at common faces 101a and 101b and, therefore, to be accessible to common external input and output oxidant gas manifolds 41 and 42, which are isolated from the manifold 31. Disposition of the passages 20 and 21, in turn, permits the cooling passages 23 to be transverse and, in particular, orthogonal, to such passages 20 and 21 and to have external entry and exit ports 23a and 23b (not visible) on stack faces 101c and 101d, which are accessible to further common input and output cooling gas manifolds 43 and 44, which are isolated from the manifolds 41, 42 and 31. The benefits of such relative disposition of the passages 20, 21 and 23 will become apparent from the discussion below.

Internal manifolding system 31 comprises first and second input conduits 32 and 33. These conduits are formed by aligned bores in the separator plates 3-12, spacer elements 71 and cooling plate 8. In particular, bores 32a form the first input conduit 32 and bores 33a form the second input conduit 33. Similar type aligned bores 34a and 35a (not visible) define output conduits 34 and 35 (not visible), respectively.

Figure 3:
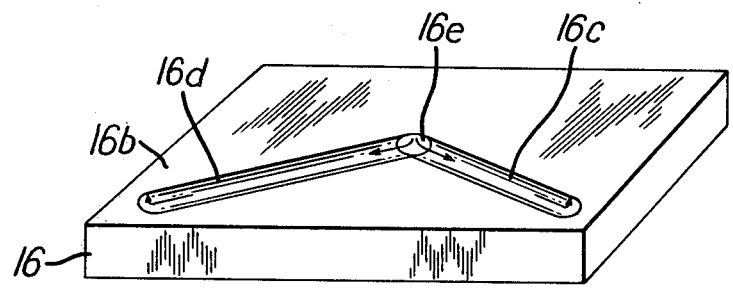
FIG. 3 shows the top plate of the stack of FIG. 1, again the plate being inverted so as to transpose left to right and right to left relative to FIG. 1 for illustrative purposes.
Figure 4:
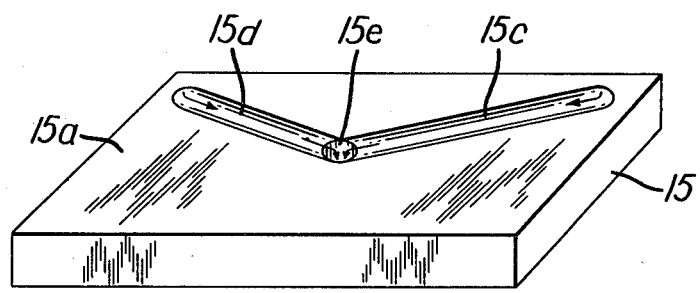
FIG. 4 shows the bottom plate of the stack of FIG. 1.

A bottom accumulator plate 15 (see, FIG. 4) includes in its top surface 15a slots 15c and 15d which communicate with the bores 34a and 35a of the cooling plate 14. These slots feed a central bore 15e which provides exit out of the stack 1. A top distributor plate 16 (see FIG. 3) provides entry into the stack through a central chamber 16e which leads to grooves 16c and 16d in its bottom surface 16b. These grooves, in turn, feed the bores 32a and 33a of the unipolar plate 3.

Figure 2:
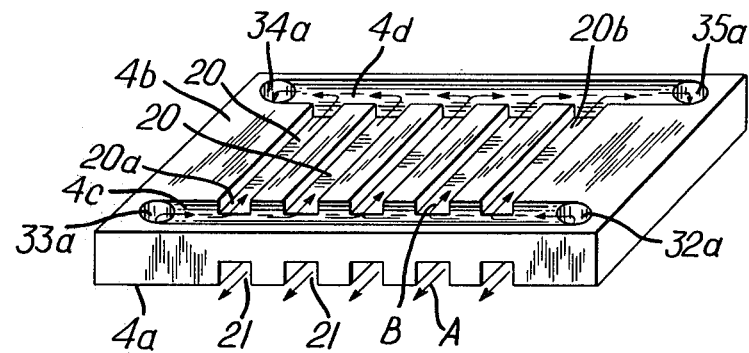
FIG. 2 illustrates a bipolar plate of the stack of FIG. 1, the plate being inverted so as to transpose left to right and right to left relative to FIG. 1, for illustrative purposes.

FIG. 2 illustrates a unitary construction of the bipolar plate 4 of FIG. 1 in greater detail. The plate 4 includes lateral internal grooves 4c and 4d in its bottom surface 4b. These grooves form part of the manifolding system 31 and provide communication between the input and output manifolds 32, 33, 34, 35 and the internal fuel passages 20. In particular, the groove 4c communicates with the input ends 20a of the passages 20 and with the bores 32a and 33a of conduits 32 and 33, while the groove 4d communicates with the output ends 20b of the passages 20 and with conduits 34 and 35 via bores 34a and 35a.

The oxidant passages 21 in the top plate surface 4a extend to the plate end faces and are in the same direction as the fuel gas passages 20. This enables the desired countercurrent flow of the respective fuel and oxidant gases as shown by the arrows A and B in FIG. 3.

The bipolar plates 5, 6 and 10-12 are of like construction as the bipolar plate 4 and, therefore, include the same surface passage configurations in their top and bottom surfaces. Unipolar plates 3 and 9, on the other hand, have bottom surfaces similar to the bottom surface 4b of bipolar plate 4, but top surfaces that are essentially flat and contain no passages. Plates 7 and 13, in turn, have flat bottom surfaces and top surfaces like the top surface 4a of plate 4.

In operation of stack 1, fuel gas is delivered to the manifold system 31 via the central chamber 16e of distributor plate 16. The fuel gas then moves via the grooves 16c and 16d to the input conduits 32 and 33. Each input conduit carries the gas down through the plates of the stack via the respective bores 32a and 32b. As the gas moves down the stack, at each plate surface 3b, 4b, 5b, 6b, 9b, 10b, 11b, 12b, a portion of the gas is coupled into the lateral entry grooves (i.e., 4c etc.). Gas so coupled then passes from the entry groove through the passages 20 of the respective plate and undergoes electrochemical reaction. Exhausted gas resulting from such reaction then exits via the respective lateral exit grove. (i.e., 4d etc.). Exhausted gas from each exit groove is coupled to either one or the other of the output conduits 35 and 36 for delivery to the respective slots 15c and 15d in accumulator plate 15 and from such slots to bore 15e for passage out of the stack.

During delivery of the fuel gas, oxidant gas is simultaneously delivered from the input manifold 41 to the entry ports 21a of the passages 21 common to stack face 101a. This gas passes through the passages 21 in a direction directly opposite that of the fuel gas in the passages 20 and undergoes electrochemical reaction. Oxidant exhaust gas passes out of the cell via common face 101b and is accumulated by the common output manifold 42. While oxidant and fuel gases are passing through the stack, heat generated in the stack by the electrochemical reaction is dissipated by the cooling gas delivered by the common input manifold 43 to the input ports 23a in common stack face 101c. Cooling gas then exits the passages 23 from exit ports 23b in common stack face 101d and enters common output manifold 44.

As can be appreciated, in the present stack configuration simultaneous and independent delivery of fuel, oxidant and cooling gases is realized utilizing manifolding which permits common delivery and extraction of the respective gases and which further allows for countercurrent flow of the former two gases. A stack of relatively simple construction and improved characteristics is thereby believed to result.

More specifically, the countercurrent flow of the fuel and oxidant gases is believed to result in a more uniform current density for each cell. A higher overall current density thereby results, as compared to the prior cross-flow constructions in which the current density distribution is considerably skewed. Independent common manifolding of the cooling gas is also advantageous in that the cooling gas is maintained isolated from the fuel cell electrolyte and therefore kept relatively clean. Also cooling gas with the highest specific heat can now be used. As a result, the reactant gas stream (the oxidant gas in the case of a phosphoric acid cell, for example) will be richer in water content thereby simplifying moisture recovery. The bipolar plates are now also capable of manufacture as unitary members, thus reducing costs and contact losses.

Figure 7:
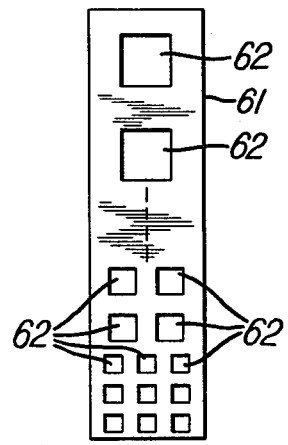
FIGS. 7 and 8 illustrate a cooling plate construction in accordance with the invention.
Figure 8:
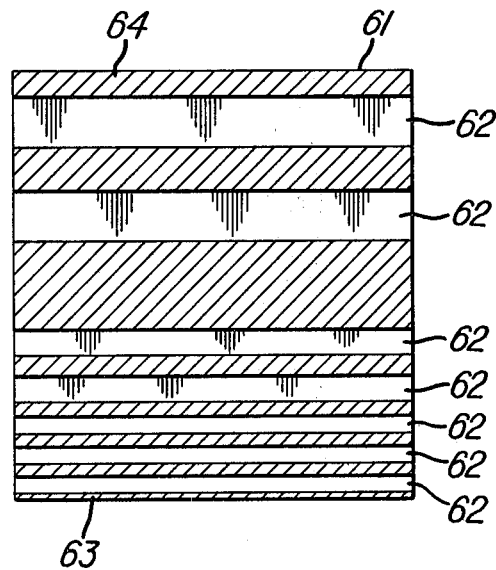

Additionally, with the present stack construction temperature distribution in the cells can be further improved, since a high heat transfer area and a large flow of cooling gas can now be distributed to areas of high heat generation, and vice versa. More specifically, FIGS. 7 and 8 show a cooling plate 61 modified to provide increased surface area and increased flow in areas of increased heating. As can be seen, this is accomplished by using a large number of smaller cooling passages 62 in the area of the plate to be placed adjacent the higher heat generating area of the stack. Such high heat generating areas are toward the oxidant gas entry ports 21a of the passages 21 in the stack of FIG. 1 and thus the plate of FIGS. 7 and 8 would be situated in the stack 1 with its side 63 toward the ports 21a and its side 64 toward the ports 21b.

Figure 5:
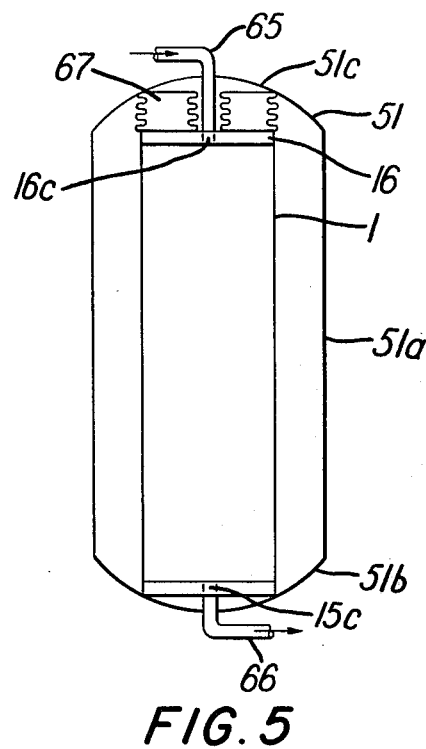
FIGS. 5 and 6 illustrate the stack of FIG. 1 enclosed by a containment vessel which defines the external manifolds for the oxidant process gas and the cooling process gas.
Figure 6:
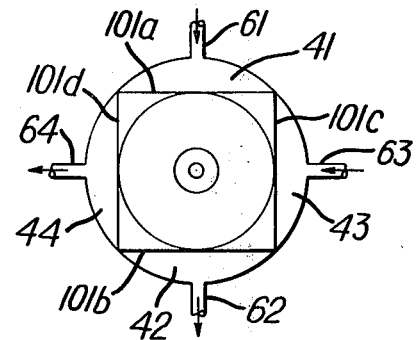

In a further aspect of the present invention, the external manifolds 41 through 44 are realized through a containment vessel which encloses the stack 1. Such a vessel is shown as 51 in FIGS. 5 and 6 and includes a central cylindrical body 51a and dome-like bottom and top covers 51b and 51c. As shown, the stack 1 sealingly engages the central body 51a at the edges formed by the stack faces 101a–101d to define the four separate sealed manifolds 41–44. Tubes 61–64 provide communication with these manifolds for gas entry and exit. Further tubes 65 and 66 provide communication with the internal manifolding system 31 via central chamber 16e of distributor plate 16 and via central bore 15e in accumulator plate 15.

A bellows 67 fixed to the top dome 51c applies a constant downward pressure or force to the stack 1, thereby securing the stack within the vessel 51. The bellows 67, which may be gas pressurized, further maintains isolation between the manifolds at the top cover 51c. At the bottom cover, engagement between the stack edges and the cover maintains this isolation.

Figure 9:
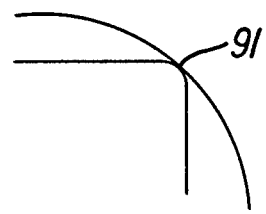
FIGS. 9 and 10 show various sealing arrangements used in conjunction with the containment vessel of FIGS. 5 and 6.

In order to facilitate the seal at the contacting edges of the stack and vessel, the stack edges can be rounded at 91 or otherwise contoured so as to more closely follow the contour of the vessel (see FIG. 9). Furthermore, an appropriate gasket material can be used to line the contact regions to provide a pliable seal and one which insulates the stack from the vessel. For high temperature applications, the gasket material might be a fibrous mat comprised, for example, of alumina or zirconia, filled with liquid electrolyte. For low temperature applications, uncured viton rubber might be used.

Figure 10:
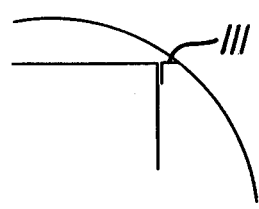

A further sealing arrangement is shown in FIG. 10 wherein at the areas to be sealed L-shaped strips 111 of an insulating material lined with a gasket material are used. In such case one arm of the L-shaped strip 111 is attached to the vessel and the other arm sealed to the stack.

The use of the containment vessel 51 considerably simplifies the external manifolds and seals and provides alignment control when used in conjunction with the bellows. Placement of the stack within the vessel can be accomplished by force fitting the stack components or by welding the vessel around the stack.

In all cases, it is understood that the above-described arrangements are merely illustrative of the many possible specific embodiments which represent applications of the present invention. Numerous and varied other arrangements can readily be devised without departing from the spirit and scope of the invention. Thus, for example, the oxidant gas and fuel gas can be reversed with the former being supplied to the internal manifolding system 31 and passages 20 and the latter to the external manifolds 41 and 42 and the passages 21.

What is claimed is

1. A fuel cell system comprising:
   a fuel cell stack including:
      a number of fuel cells, each including a first passage means having first input and output ports for conveying a first process gas through the cell and a second passage means having second input and output ports for conveying a second process gas through the cell, said first and second passage means being disposed in opposition to support countercurrent flow of said first and second process gases;
   first manifolding means internal of said fuel cells and common to said first passages for conveying said first process gas.
   a number of third passage means for conveying a cooling gas through said stack.

2. A fuel cell system in accordance with claim 1 wherein:
   said first passage means extend in a first direction and said second passage means extend in a second direction directly opposite to said first direction.

3. A fuel cell system in accordance with claim 1 wherein:
   said third passage means is transverse of said first and second passage means.

4. A fuel cell system in accordance with claim 3 wherein:
   said third passage means is orthogonal to said first and second passage means.

5. A fuel cell system in accordance with claim 3 wherein:
   each of said third means has third input and output ports.

6. A fuel cell system in accordance with claim 5 further comprising:
   first second external means for coupling said second process gas and said cooling gas with said second and third passage means, respectively.

7. A fuel cell system in accordance with claim 6 wherein:
   said first external means includes first and second external manifolds common to said second input and output parts, respectively;
   and said second external means includes third and fourth external manifolds common to said third input and output ports, respectively.

8. A fuel cell system in accordance with claim 7 wherein:
   said first through fourth external manifolds are jointly defined by a containment vessel surrounding said stack.

9. A fuel cell system in accordance with claim 8 further comprising:
   sealing means in contact with said stack and the inner wall of said containment vessel to seal said manifolds one from the other.

10. A fuel cell system in accordance with claim 8 wherein:
    said second input and output ports open out of first and second external faces of said stack;
    and said third input and output ports open out of third and fourth external faces of said stack;
    and the ends of said first through fourth faces cooperate with said inner wall of said containment vessel to form said first through fourth manifolds.

11. A fuel cell system in accordance with claim 10 wherein:
    said ends of said first through fourth faces engage said inner wall.

12. A fuel cell system in accordance with claim 11 wherein:
    said ends of said faces are contoured to follow the surface of said inner wall.

13. A fuel cell system in accordance with claim 10 further comprising:
first through fourth seals in contact with ends of said first through fourth faces and with said inner wall.

14. A fuel cell system in accordance with claim 10, 11, 12 or 13 wherein:
said first through fourth faces are substantially flat.

15. A fuel cell system in accordance with claim 8 further comprising:
means for retaining said stack in said vessel.

16. A fuel cell system in accordance with claim 15 wherein:
said retaining means comprises a bellows.

17. A fuel cell system in accordance with claim 8 further comprising:
first and second pipes extending through said vessel and into said stack for communicating with the input and output ends of said internal manifolding means.

18. A fuel cell system in accordance with claim 8 wherein:
said first process gas is fuel gas;
and said second process gas is oxidant gas.

19. A fuel cell system in accordance with claim 18 further comprising:
means for supplying fuel gas to said first external manifold;
and means for supplying oxidant gas to said internal manifold means.

20. A fuel cell system in accordance with claim 1 wherein:
said internal manifolding means comprises:
a first conduit extending through said stack and common to said first input ports;
a second conduit extending through said stack and common to said first output ports.

21. A fuel cell system in accordance with claim 20 wherein:
said internal manifolding means further comprises for each cell:
a first groove transverse to the first passage means of that cell and connecting said first conduit and the first input port of the first passage means of that cell;
and a second groove transverse to said first passage means of that cell and connecting said second conduit and the first output port of the first passage means of that cell.

22. A fuel cell system in accordance with claim 21 wherein:
each fuel cell comprises:
a cell assembly including anode and cathode electrodes sandwiching an electrolyte;
and first and second separator plates disposed adjacent said anode and cathode electrodes.

23. A fuel cell in accordance with claim 22 wherein:
the first separator plate of each cell has first passages which face the corresponding anode electrode and run in a first direction and whose opposite first and second ends terminate short of the periphery of the plate, said first passages forming said first passage means of that cell;
and the second separator plate of each cell has passages which face the corresponding cathode electrode and run in said first direction and whose opposite ends terminate at the plate periphery, said second passages forming said second passage means of that cell.

24. A fuel cell in accordance with claim 23 wherein:
the first groove of each cell is in the first separator plate of that cell and crosses the first ends of the first passages of that separator plate;
the second groove of each cell is in the first separator plate of that cell and crosses the second ends of the first passages of that separator plate.

25. A fuel cell system in accordance with claim 24 wherein:
each cell includes a first bore running through the cell and into the first groove and a second bore running through the cell and into the second groove;
said first bores of said cells being in alignment to form said first conduit and said second bores of said cells being in alignment to form said second conduit.

26. A fuel cell system in accordance with claim 25 further comprising:
means for conveying said first process to said first bore of the top cell in said stack;
and means for receiving exhausted first process gas from the second bore of the bottom cell in said stack.

27. A fuel cell system in accordance with claim 1 in which:
each of said third passage means includes a cooling plate having third passages whose ends extend to the periphery of the cooling plate.

28. A fuel cell system in accordance with claim 1 in which:
the third passages of each cooling plate are of size and distribution to provide increased cooling in areas of said stack at a higher temperature.

29. A fuel cell system in accordance with claim 28 wherein:
the third passages of said plate are of smaller size and of larger number in preselected areas of said plate relative to other areas of said plate, said preselected areas of said plate being disposable adjacent areas of stack at a higher temperature relative to other areas of said stack.

30. A fuel cell system in accordance with claim 29 wherein:
said preselected areas are toward one side of said plate.

* * * * *